US008423935B1

(12) United States Patent
Manovit et al.

(10) Patent No.: US 8,423,935 B1
(45) Date of Patent: Apr. 16, 2013

(54) METHOD AND APPARATUS FOR VERIFYING OUTPUT-BASED CLOCK GATING

(75) Inventors: Chaiyasit Manovit, Bangkok (TH);
Sridhar Narayanan, Cupertino, CA (US); Wanlin Cao, Sunnyvale, CA (US); Sridhar Subramanian, Cupertino, CA (US); Alok Kuchlous, Bangalore (IN)

(73) Assignee: Xilinx, Inc., San Jose, CA (US)

( * ) Notice: Subject to any disclaimer, the term of this patent is extended or adjusted under 35 U.S.C. 154(b) by 42 days.

(21) Appl. No.: 13/035,767

(22) Filed: Feb. 25, 2011

(51) Int. Cl.
*G06F 17/50* (2006.01)

(52) U.S. Cl.
USPC .......................................... 716/107; 716/108

(58) Field of Classification Search ........... 716/104–108
See application file for complete search history.

(56) References Cited

U.S. PATENT DOCUMENTS

| 2003/0115562 | A1* | 6/2003 | Martin et al. ............... 716/5 |
| 2007/0226664 | A1* | 9/2007 | Gemmeke et al. ............ 716/5 |
| 2009/0138837 | A1* | 5/2009 | Baumgartner et al. ......... 716/6 |

OTHER PUBLICATIONS

U.S. Appl. No. 12/835,638, filed Jul. 13, 2010, Manovit et al.

* cited by examiner

*Primary Examiner* — Binh Tat
(74) *Attorney, Agent, or Firm* — Kin-Wah Tong; Gerald Chan

(57) ABSTRACT

One embodiment of a method for verifying functional equivalency between a design of an integrated circuit and a corresponding clock-gated design utilizing output-based clock gating includes selecting a first one of a first plurality of internal state elements in the design and a corresponding first one of a second plurality of internal state elements in the clock-gated design, wherein an input to the first one of the first plurality of internal state elements serves as a first comparison point and an input to the corresponding first one of the second plurality of internal state elements serves as a second comparison point, and the design is to be compared against the clock-gated design at the first comparison point and the second comparison point and generating a test bench that identifies the first comparison point and the second comparison point as a set of comparison points.

20 Claims, 5 Drawing Sheets

METHOD AND APPARATUS FOR VERIFYING OUTPUT-BASED CLOCK GATING

FIELD OF THE DISCLOSURE

An embodiment relates generally to integrated circuits and relates more particularly to clock gating for integrated circuit applications.

BACKGROUND

Output-based clock gating is a technique that is used to reduce the dynamic switching power of an integrated circuit. In particular, this technique analyzes an integrated circuit design to determine the conditions under which logic and clock switching frequency can be suppressed. These conditions are embodied in the form of clock enables (or logic equations), which are in turn synthesized into the original design to produce a clock-gated design.

One consequence of this technique is that the combinational equivalence between the original design and the clock-gated design is broken. That is, due to the addition of the clock enables in the clock-gated design, the combinational logic that generates the state values of the respective internal state elements will not be logically equivalent. It therefore becomes a challenge to verify that the clock-gated design is functionally identical to the original design.

SUMMARY

In one embodiment, a method and apparatus for verifying output-based clock gating are disclosed. For example, one embodiment of a method for verifying functional equivalency between a design of an integrated circuit and a corresponding clock-gated design utilizing output-based clock gating includes selecting a first one of a first plurality of internal state elements in the design and a corresponding first one of a second plurality of internal state elements in the clock-gated design, wherein an input to the first one of the first plurality of internal state elements serves as a first comparison point and an input to the corresponding first one of the second plurality of internal state elements serves as a second comparison point, and the design is to be compared against the clock-gated design at the first comparison point and the second comparison point and generating a test bench that identifies the input to the first one of the first plurality of internal state elements and the input to the corresponding first one of the second plurality of internal state elements as a set of comparison points.

In various embodiments of the method, a value at the first comparison point in the design will match a value at the second comparison point in the clock-gated design, when the clock-gated design is functionally equivalent to the design; the selection includes tracking at least one observability don't care (ODC)-based clock gating condition that propagates upstream in the clock-gated design until an internal state element is reached at which an input is not affected by the at least one ODC-based clock gating condition, the internal state element being the first one of the first plurality of internal state elements; the first one of the first plurality of internal state elements and the corresponding first one of the second plurality of internal state elements has an existing clock gating condition in the design; the corresponding first one of the second plurality of internal state elements has an observability don't care (ODC)-based clock gating condition in the clock-gated design in addition to the existing clock gating condition.

In various embodiments of the method, the observability don't care (ODC)-based clock gating condition is not propagated upstream; the first comparison point mimics a value of an input to the first one of the first plurality of internal state elements in accordance with a value of a clock enable defined by the existing clock gating condition; the first one of the first plurality of internal state elements and the corresponding first one of the second plurality of internal state elements are flip flops; the first one of the first plurality of internal state elements and the corresponding first one of the second plurality of internal state elements are flip flop macro structures; the first one of the first plurality of internal state elements and the corresponding first one of the second plurality of internal state elements are memory structures; the first comparison point and the second comparison point each comprises an address value and a write data-in value to the memory structures during a clock cycle in which a write enable signal is active to the memory structures; the method further includes identifying a second one of the first plurality of internal state elements and a corresponding second one of the second plurality of internal state elements that have an observability don't care (ODC)-based clock enable and incorporating into the test bench a condition that causes a faulty value to be injected at an output of the second one of the first plurality of internal state elements and at an output of the corresponding second one of the second plurality of internal state elements at a clock cycle during which the ODC-based clock enable is zero;

This embodiment of the method further includes performing, subsequent to an injection of the faulty value, a logic comparison at an observable point in the design and a corresponding observable point in the clock-gated design, wherein the logic comparison verifies that the clock-gated design is functionally equivalent to the design when the faulty value does not propagate to the observable point in the design and the corresponding observable point in the clock-gated design and when logic values compared at the observable point in the design and at the corresponding observable point in the clock-gated design are identical; the corresponding second one of the second plurality of internal state elements is an internal state element in the clock-gated design whose ODC-based clock enable is zero at a cycle in the clock gated design; the second one of the first plurality of internal state elements is an internal state element in the design that corresponds to the corresponding second one of the second plurality of internal state elements in the clock-gated design whose ODC-based clock enable is zero at a cycle in the clock gated design; the second one of the corresponding second plurality of internal state elements corresponds to a first internal state element in the clock-gated design whose ODC-based clock enable is zero at a cycle in the clock gated design and the second one of the first plurality of internal state elements in the design corresponds to the first internal state element in the clock-gated design; the test bench is geared for use in a simulation verification environment; and the first one of the second plurality of internal state elements has an observability don't care (ODC)-based clock gating condition in the clock-gated design.

According to another embodiment, a non-transitory computer-readable storage medium having stored thereon a plurality of instructions is provided. The plurality of instructions includes instructions which, when executed by a processor, cause the processor to perform steps of a method for verifying functional equivalency between an design of an integrated circuit and a corresponding clock-gated design utilizing output-based clock gating, where the design comprises a first plurality of internal state elements and the clock-gated design comprises a second plurality of internal state elements. The method includes selecting a first one of the first plurality of internal state elements and a corresponding first one of the second plurality of internal state elements, wherein an input to the first one of the first plurality of internal state elements serves as a first comparison point and an input to the corresponding first one of the second plurality of internal state elements serves as a second comparison point, and the design is to be compared against the clock-gated design at the first comparison point and the second comparison point and generating a test bench that identifies the input to the first one of the first plurality of internal state elements and the input to the corresponding first one of the second plurality of internal state elements as a set of comparison points.

According to another embodiment, a method for verifying functional equivalency between a design of an integrated circuit and a corresponding clock-gated design utilizing output-based clock gating, where the design comprises a first plurality of internal state elements and the clock-gated design comprises a second plurality of internal state elements is provided. The method includes: selecting a first one of the first plurality of internal state elements and a corresponding first one of the second plurality of internal state elements, wherein the first one of the plurality of internal state elements and the corresponding first one of the second plurality of internal state elements have an observability don't care (ODC)-based clock enable, and generating a test bench that causes a faulty value to be injected at an output of the first one of the plurality of internal state elements and at an output of the corresponding one of the second plurality of internal state elements at a clock cycle during which the ODC-based clock enable is zero.

BRIEF DESCRIPTION OF THE DRAWINGS

Accompanying drawings show exemplary embodiments in accordance with one or more aspects of the disclosure; however, the accompanying drawings should not be taken to limit the disclosure to the embodiments shown, but are for explanation and understanding only.

DETAILED DESCRIPTION OF THE DRAWINGS

Figure 1:
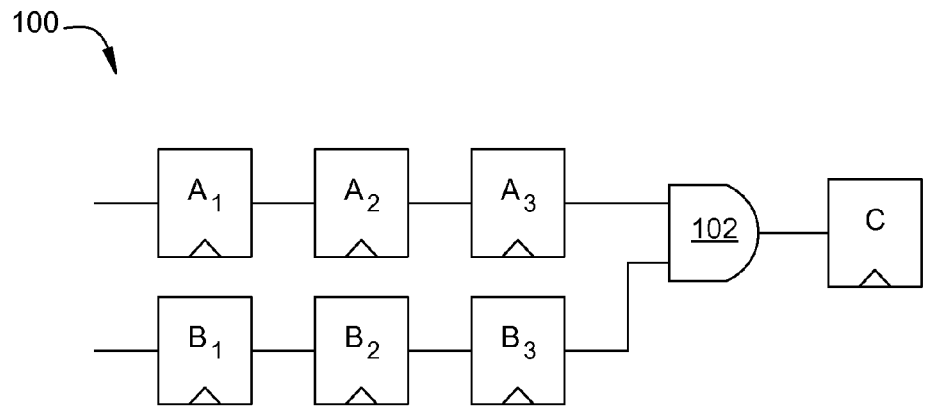
FIG. 1 illustrates an exemplary pipeline, comprising a plurality of state elements.

An embodiment employs complementary techniques that may be used alone or in combination to verify output-based clock gating of an integrated circuit design. A first technique compares a subset of internal state points in the original design and the clock-gated design. Such comparison is possible when certain conditions are met. A second technique deliberately injects a faulty value into the design at predetermined locations (e.g., state elements) and times (e.g., clock cycles). The injection of the faulty value is driven by knowledge of where clock gating has been employed in the design. Incorrect clock gating logic in the clock-gated design is indicated when the faulty value reaches a comparison point identified by the first technique. These techniques improve the verification coverage and enhance the effectiveness of simulation-based equivalency checking for clock-gated designs that use output-based clock gating.

As used herein, the term "state element" refers to a hardware structure that stores logic values and requires a clock to update these logic values. Thus, a state element may be, for example, a flip flop, a latch, a macro, or another hardware structure. In output-based clock gating, a state element may be clock gated if its output will not be observed in the next clock cycle. This condition is referred to as "Observability Don't Care" or "ODC." By clock gating the state element in this manner, one reduces the switching activity at both the clock input and the state element output. This, in turn, leads to a reduction in the switching power at the state element. Aggregating this reduction in switching activity across multiple clock-gated state elements in a design can lead to a significant reduction in the dynamic power of the design.

When the state element is clock-gated by ODC, its output in the next clock cycle may not match the value produced in the original design. This makes it difficult for combinational equivalence checking (CEC) to prove the equivalence between the original design and the ODC-based clock-gated design. Sequential equivalence checking (SEC) allows the internal states of the original design and the clock-gated design to have different values, as long as their overall sequential behaviors match. However, conventional SEC is slow and tedious for large designs.

Given the intractability of formal verification methods, simulation-based equivalence checking is a popular tool for verifying clock-gated designs. In this approach, logic simulates the original design and the clock-gated design with the same stimuli, and the respective primary outputs are then compared. However, this approach can only compare primary outputs (i.e., due to potential internal state mismatches in ODC-based clock-gated designs). Because the number of primary outputs tends to be much smaller than the number of state elements, this limits test coverage.

One embodiment of the disclosure therefore specifies the conditions under which some internal states can act as comparison points. That is, the values of the clock-gated design at these points will always match the values of the corresponding points in the original design, despite direct or indirect involvement in ODC-based clock gating. These comparison points greatly improve the verification coverage.

FIG. 1 illustrates an exemplary pipeline 100, comprising a plurality of state elements (e.g., flip flops) A1-A3, B1-B3, and C. Specifically, the state elements A1-A3 and B1-B3 provide respective outputs to an AND gate 102, which in turn provides an output to the state element C.

Figure 2:
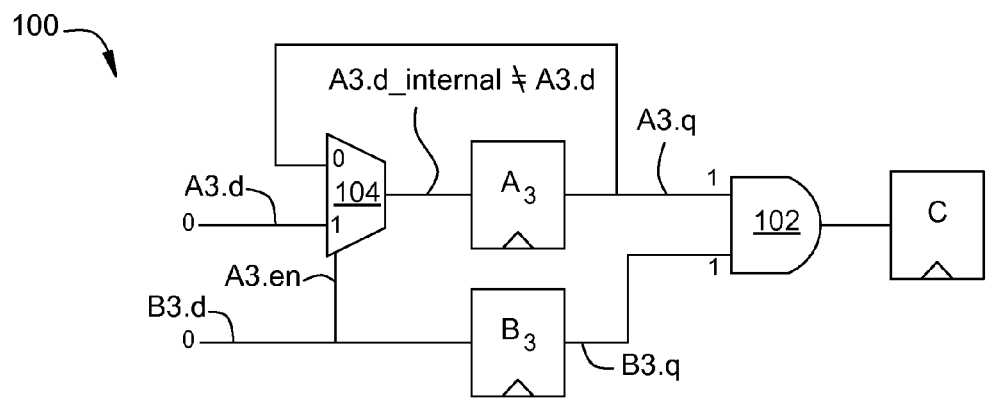
FIG. 2 illustrates a portion of the pipeline illustrated in FIG. 1, in which Observability Don't Care analysis has been applied to a state element illustrated in FIG. 1.

In general, an ODC condition can be propagated backward through the pipeline 100 to clock-gate an upstream state element whose value will not be observed when its corresponding clock enable signal is zero. FIG. 2, for example, illustrates a portion of the pipeline 100 illustrated in FIG. 1, in which ODC analysis has been applied to the state element A3. Thus, FIG. 2 may be considered a clock-gated version of the original design illustrated in FIG. 1. Clock gating insertion in FIG. 2 is illustrated as a feedback multiplexer 104 positioned directly upstream from the clock-gated state element A3.

The original input to the clock-gated state element A3 (i.e., immediately upstream from the feedback multiplexer 104) is denoted by the signal "A3.d," while the final input to the clock-gated state element A3 (i.e., immediately downstream from the feedback multiplexer 104) is denoted by the signal "A3.d_internal." The clock enable condition (i.e., the inverse of the "clock gating" condition as used herein) is denoted by the signal "A3.en," and the output of the clock-gated state element A3 is denoted by the signal "A3.q." Based on the illustrated input values to the AND gate 102 in FIG. 2, in the next cycle, the value of A3.q will remain at one and will not go to zero. This differs from the value of the state element A3's output in the original design, thus violating combinational equivalence. However, although the value of A3.q in the clock-gated design may differ from the value of the state element A3's output in the original design (i.e., FIG. 1), the value at the final output from the state element C in the clock-gated design of FIG. 2 will always match the value at the final output from the state element C in the original design of FIG. 1.

For example, consider the case in which the output of the state element B3 is known to be zero. Since the output of the AND gate 102 depends upon the outputs of both state elements A3 and B3, in this case, the output of the state element A3 will not matter (i.e., will not change the output of the AND gate 102, or, consequently, the output of the state element C). Thus, the state element A3 need not be clocked in the previous clock cycle.

Hence, the clock-gated design illustrated in FIG. 2 is sequentially equivalent to the original design illustrated in FIG. 1. It is noted, however, that the value of A3.d is not affected by the clock gating, and only the value of A3.d_internal is different in the clock-gated and original designs.

Figure 3:
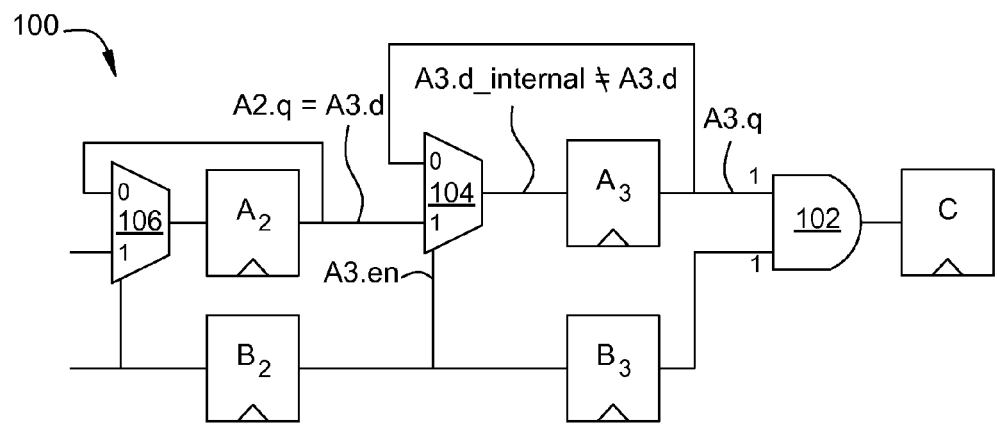
FIG. 3 illustrates the propagation of the Observability Don't Care condition illustrated in FIG. 2 to an upstream state element.

FIG. 3 illustrates the propagation of the ODC condition illustrated in FIG. 2 to an upstream state element. Specifically, FIG. 3 illustrates the next step in the ODC analysis, in which the ODC condition is propagated from the clock-gated state element A3 to the immediately upstream state element A2. As illustrated, the state element A2 is clock-gated in the same manner as the state element A3. Specifically, a second feedback multiplexer 106 is positioned directly upstream from the clock-gated state element A2.

Figure 4:
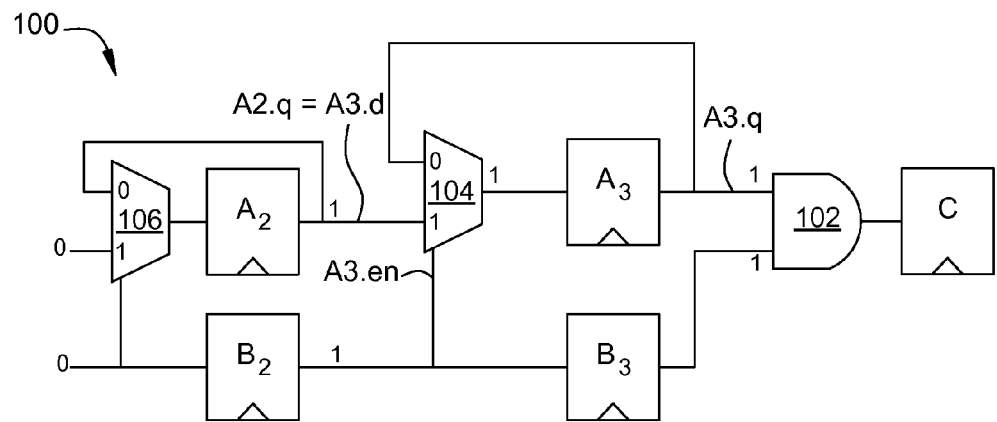
FIG. 4 illustrates one possible setting of internal logic values at a given clock cycle resulting from the propagation of the Observability Don't Care condition illustrated in FIG. 3.

FIG. 4 illustrates one possible setting of the internal logic values in the design resulting from the propagation of the ODC condition as illustrated in FIG. 3. As illustrated, with clock gating being enforced on both state elements A3 and A2, the values of A2.q (i.e., the output of the clock-gated state element A2) and A3.d in the clock-gated design may now differ from the values of the corresponding state elements in the original design. Specifically, based on the illustrated input values in FIG. 4, in the next clock cycle, A2.q will not change to zero; thus the values of A2.q and hence A3.d will differ from the values of the corresponding state elements in the original design.

As discussed above with respect to FIG. 2, the value of A3.d will not be affected by clock gating when the ODC condition is not propagated from state element A3 to state element A2. Thus, for verification purposes (in addition to comparing the primary outputs of the original and clock-gated designs), one or more embodiments identify and use the value of A3.d as a comparison point for the original design and the clock-gated design. Thus, one embodiment of the present disclosure tracks which ODC-based clock gating conditions are propagated backward (i.e., upstream) as a means to identify internal state elements whose inputs can act as comparison points for the original design and the clock-gated design. That is, state elements are identified for which the inputs are not affected by backward propagating ODC-based clock gating condition; the inputs to these state elements may serve as valid comparison points.

Figure 5:
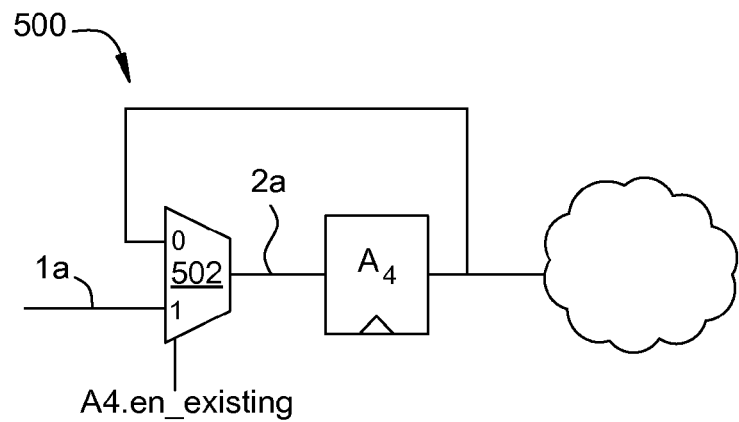
FIG. 5 illustrates a portion of an original design in which a state element is subject to an existing clock enable condition.
Figure 6:
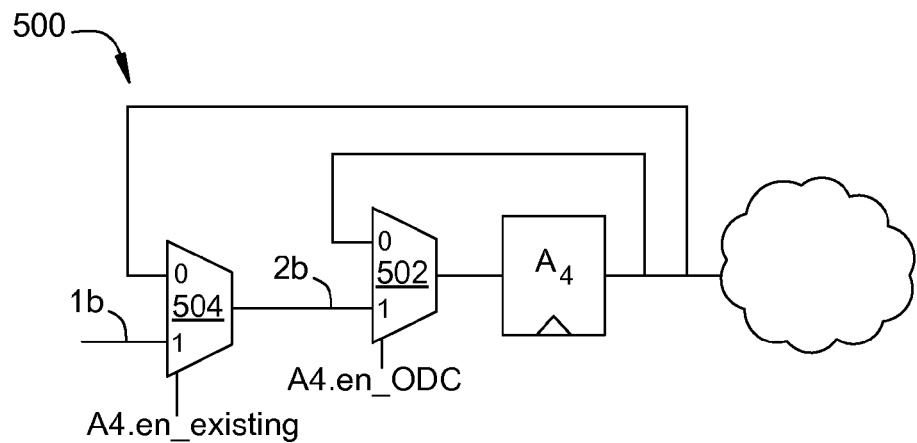
FIG. 6 illustrates the portion of the original design illustrated in FIG. 5, in which an ODC-based clock enable condition is additionally imposed on the state element.

In one embodiment, the ODC-based clock gating condition is combined with an existing clock gating condition at a state element. FIG. 5, for example, illustrates a portion 500 of an original design in which a state element denoted by A4 is subject to an existing clock enable condition (represented by a feedback multiplexer 502). FIG. 6 illustrates the portion 500 of the original design illustrated in FIG. 5, in which an ODC-based clock enable condition (represented by a feedback multiplexer 504) is additionally imposed on the state element A4.

Figure 7:
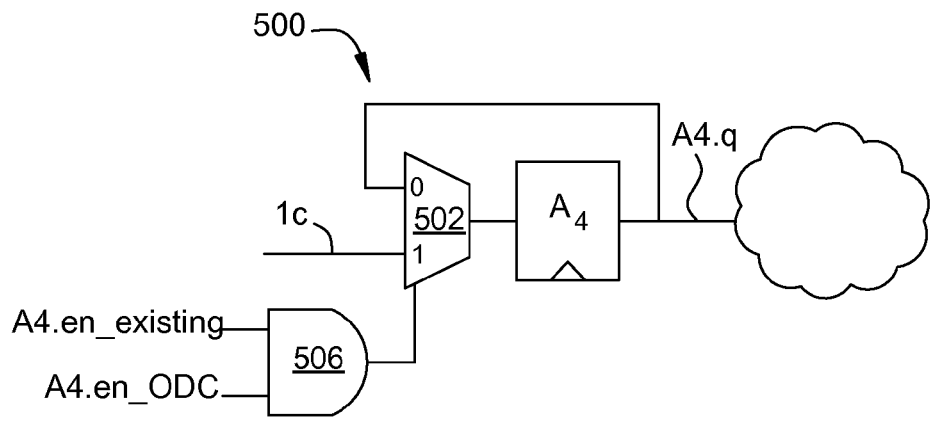
FIG. 7 illustrates an alternative embodiment, in which multiple clock enable conditions in the portion of the design illustrated in FIG. 6 are combined with a logical AND gate.

FIG. 7 illustrates an alternative embodiment, in which the multiple clock enable conditions in the portion 500 of the design illustrated in FIG. 6 are combined with a logical AND gate 506. As a result, only one feedback multiplexer 502 is required. This alternative embodiment as illustrated in FIG. 7 is exemplary of the physical realization of the clock enable condition in an integrated circuit.

In the embodiments illustrated in FIGS. 5-7, it is also possible to identify a comparison point, as long as the ODC-based clock gating condition is not propagated backward from the state element A4. Identifying the logic values to be compared, however, may be more challenging. For example, the signals 1a and 1b are valid comparison points for the original (FIG. 5) and clock-enabled (FIG. 6) designs, as these signals are not affected by the ODC clock gating at the state element A4. However, the signals 2a and 2b are better comparison points in terms of verification coverage, because a comparison of 2a and 2b will also compare the value of the signal A4.q when it is fed back (i.e., when the signal A4.en_existing is zero). Unfortunately, FIG. 7 includes no physical wire or net that is equivalent to 2b in FIG. 6.

Thus, one or more embodiments of the disclosure mimic 2b in FIG. 7 by defining the logical expression for a signal 2c:

$$2c = A4.\text{en\_existing} ? 1c : A4.q \quad \text{(EQN. 1)}$$

and then comparing 2a against 2c in the test bench. Furthermore, since A4.en_existing may no longer exist as a physical wire or net in the clock-gated design (due to possible logic optimizations performed when combining the ODC clock enable with the existing enable in the clock-gated design), the value of A4.en_existing may be taken from the original design.

A state element in the designs may have set and/or reset ports, and these ports are accounted for in the comparison mechanism. Consider, for example, the case in which state element A4 in FIG. 5 has a synchronous reset input (denoted as "A4.reset"), which takes precedence over the clock enable input. The logical expression for the signal 2c when comparing 2a and 2c in the test bench needs to be modified as follows to account for the presence of the reset port in the state element A4:

$$2c = (A4.\text{en\_existing} \& \sim A4.\text{reset}) ? 1c : A4.q \quad \text{(EQN. 2)}$$

In a similar fashion, one can account for the presence of both synchronous and asynchronous reset and set ports at the state elements whose inputs are being used as comparison points.

Many designs contain special structures such as memories (e.g., block random access memories) and flop macro structures (e.g., shift registers in which all flip flops in the registers are controlled by a single clock enable). These special structures can also be "clock-gated" via ODC-based analysis such as that described above.

For flop macro structures such as shift registers, one or more embodiments of the disclosure identify conditions under which the outputs of the macro structure are not being used in the next clock cycle, and these conditions may be used to derive an enable for the entire macro structure. As in the case of the single state element illustrated in FIGS. 5-7, if the ODC clock enable derived for the macro structure is not propagated backward, the inputs to the macro structure can act as valid comparison points between the original design and the clock-gated design.

For memory structures, deriving ODC clock enables is a function of whether a write operation or read operation is happening at the memory structure and, if so, identifying the associated consumers of data for each operation. For example, the outputs of the write data register will only be used if a write operation is going to be performed in the memory; hence, a version of the write enable signal can potentially be used as an ODC clock enable for the write data register. To verify the correctness of enables generated for memory structures, one or more embodiments of the disclosure add certain targeted checks to the simulation-based verification environment. These targeted checks are based on knowledge of the memory structure design and operation. For instance, if the write enable signal is active to a particular memory structure at a given clock cycle, the address values and write data-in values to the memory structure must be identical between the original design and the clock-gated design in that given clock cycle. Under such conditions, one can use the address values and write data-in values as valid internal comparison points between the original and clock-gated designs.

Embodiments of the disclosure employ other basic checks to directly target the ODC clock enables created in the clock-gated design. As one example, for any state element A that has been clock-gated with an ODC enable, if the clock enable to the state element A is one in any clock cycle in the clock-gated design, then the clock enable to state element A in the original design must also be one. Incorporating checks such as this into the verification process increases the confidence in the correctness of the enables generated for the clock-gated design.

Thus, generating an ODC enable for a state element relies at least in part on identifying the conditions under which the output of the state element will not be consumed (or, equivalently, the output will not propagate to either an internal comparison point or a primary output). When these conditions are satisfied for the state element at a given clock cycle, the state element need not be clocked or updated at that clock cycle. These conditions are then converted into logic equations based on signals in the design, and the logic equations are then synthesized into a clock enable for the state element. To illustrate this, consider again the example illustrated in FIG. 2. When the signal B3.$d$ is zero, the output of the state element A3 will not be consumed in the next clock cycle, since it is blocked at the AND gate 102 due to B3.$q$ (the other input of the AND gate 102) being zero, as discussed above. As a result, B3.$d$ can directly be used as a clock enable for the state element A3.

In simulation-based equivalency checking, one or more embodiments of the disclosure verify that ODC-based clock enables such as those discussed above have been correctly generated and implemented in the clock-gated design by taking advantage of the same concept that was used to generate the clock enables. Specifically, whenever the ODC-based clock enable of a clock-gated state element goes to zero (i.e., implying that the output of the state element is a "don't care" in the next cycle), one or more embodiments of the disclosure inject a "faulty" logic value at the state element's output. For instance, in one embodiment, a faulty value is injected in a four-valued logic simulation environment by injecting an "X" value at the output. In an alternative embodiment, a faulty value is injected in a two-valued simulation environment by injecting a randomly generated value of one or zero at the output. The expectation for functionally correct behavior is that the faulty logic value should not propagate to an observable point (e.g., an internal comparison point, as discussed above, or a primary output of the design). For example, referring again to FIG. 2, injecting an "X" value at B.3$q$ for every clock cycle when B3.$d$ is zero will have no impact on the logic value seen at the input or output of the state element C.

Thus, in one embodiment, a faulty value is injected at the output of at least one state element in a simulation-based verification environment. The injection of the faulty value is based on knowledge of which state elements have ODC-based clock enables, as discussed above. In particular, the faulty value is injected at every clock cycle at which any of the ODC-based clock enables is zero.

Figure 8:
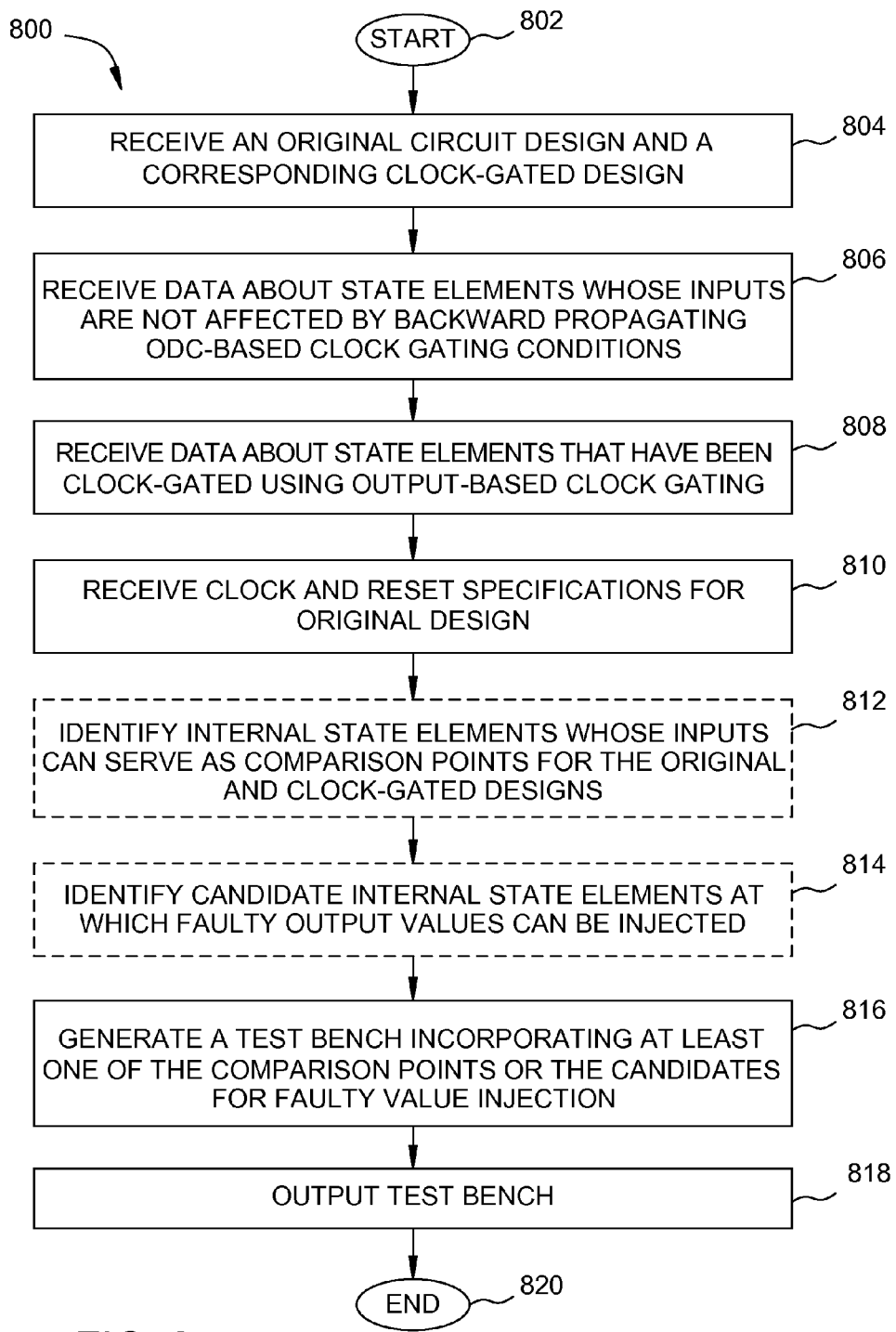
FIG. 8 is a flow diagram illustrating one embodiment of a method for generating a test bench by which output-based clock gating of an integrated circuit design can be verified.

FIG. 8 is a flow diagram illustrating one embodiment of a method 800 for generating a test bench by which output-based clock gating of an integrated circuit design can be verified. In one embodiment, the method 800 is implemented as part of a logic simulator. In an alternate embodiment, the method 800 is implemented as part a separate or stand alone tool that is coupled to a logic simulator. The method 800 employs one or more of the above-described approaches in order to generate a test bench that can be used by a logic simulator to verify output-based clock gating of an integrated circuit design.

The method 800 is initialized at step 802 and proceeds to step 804, where an original (i.e., non-clock-gated) design for an integrated circuit and a corresponding clock-gated design for the integrated circuit are received. The test bench that is ultimately generated will verify the functional equivalency of the original design and the corresponding clock-gated design. In one embodiment, the original design and the clock-gated design are specified in a hardware description language (e.g., Verilog or very-high-speed integrated circuit hardware description language (VHDL)).

In step 806, data about state elements whose inputs are not affected by backward propagating ODC-based clock gating conditions is received. Specifically, this data identifies internal state elements (e.g., flip flops) whose inputs can serve as valid comparison points between the original and clock-gated designs.

In step 808, data about state elements that have been clock-gated using output-based clock gating is received. Specifically, this data identifies internal state elements (e.g., flip flops) that are clock-gated in the clock-gated design using output-based clock gating. In step 810, the clock and reset specifications for the original design are also received.

In step 812, the received inputs (i.e., the original and clock-gated designs, the data regarding valid internal comparison points and clock-gated state elements, and the clock and reset specifications) are used to identify internal state elements whose inputs can serve as comparison points for the original and clock-gated designs, as discussed above. In one embodiment, these internal state elements are identified by tracking ODC-based clock gating conditions that are propagated backward, as discussed in connection with FIGS. 1-4.

In other embodiments, step 812 involves identifying state elements that are subject to existing clock gating conditions, as discussed in connection with FIGS. 5-7. This may further involve accounting for the presence of synchronous and/or asynchronous set and reset ports in the state elements.

In other embodiments still, comparison points and targeted checks for special structures (e.g., memories, flip flop macro structures, analog blocks, mixed-mode clock managers, phase-locked loops, or other black-boxed state elements whose inputs may be valid comparison points) are also defined in step 812, as discussed above.

In step 814, the received inputs are used to identify candidate internal state elements at which faulty output values can be injected, as discussed above. In one embodiment, the candidate internal state elements are identified in accordance with knowledge of which state elements have ODC-based clock enables. In particular, at every clock cycle at which any of these ODC-based clock enables is at zero, a faulty value can be injected at the output of the associated state element (in the simulation verification environment). If these ODC-based clock enables have been generated correctly, none of the injected faulty values will propagate to an observable point in the simulation.

In step 816, a test bench is generated. The test bench incorporates at least one of the comparison points identified in step 812 or the candidates for faulty value injection identified in step 814.

The test bench is output (e.g., to a logic simulator) in step 818 before the method 800 terminates in step 820. Subsequently, a logic simulator can simulate the original and clock-gated designs, the test bench, and any associated library files. If any failures are identified as a result of the simulation, debug information can be produced for identifying the causes of the failures.

In one embodiment, the injection of faulty values at state element outputs is timed relative to the comparisons performed at the internal points and primary outputs. Specifically, in one embodiment, the faulty values that are injected at state elements whose ODC-based clock enables are zero are timed such that the faulty values remain in effect when the logic values at the internal comparison points and primary outputs (of the original and clock-gated designs) are compared.

The injection of a faulty value for a state element whose ODC-based clock enable is zero may be performed at the state element in the clock-gated design, at the corresponding state element in the original design, or simultaneously at the corresponding elements in both the clock-gated and original designs. When the faulty value is simultaneously injected into both the clock-gated and original designs, the presence of an "X" value in either design during the evaluation of logic values at comparison points is flagged as a failure.

Embodiments of the disclosure may be extended in several ways. For example, referring back to FIGS. 5-7, an ODC-based clock enable may be used to augment an existing gating condition at a state element. As discussed above, it may be difficult to identify the two components of the resulting combined clock enable (referred to as "A4.en_combined") for the state element A4 due to possible logic optimizations. In this case, the condition for injecting the faulty value at the output of the state element A4 in any clock cycle is modified to verify that: (1) the value of A4.en_combined is zero in the clock-gated design; and (2) that the value of A4.en_existing is one in the original design. If, however, it is possible to identify A4.en_ODC as a separate component in the clock-gated design, then it is sufficient to simply set A4.en_ODC going to zero as a condition for injecting a faulty value at the output of the state element A4.

In an alternative embodiment, the state element A4 acts as an internal comparison point at which the signal $2a$ in the original design is compared against the signal $2c$ in the clock-gated design, where $2c$ is defined as stated in EQN. 1. The signal $1c$ is generated from combinational logic driven by state elements that might have been clock-gated with ODC-based clock enables. If faulty values are injected at the outputs of state elements in the verification environment, then the faulty values must continue to be valid when the logic value at the signal $1c$ is sampled in the clock-gated design. However, the logic value at the signal $A4.q$ that should be sampled in EQN. 1 refers to the state value stored in the state element A4, and not the faulty value injected at the output of the state element A4 (should the state element A4 satisfy the conditions for injection of a faulty value at its output).

Even in a four-valued logic simulation environment, there are certain cases under which the faulty value injected at a state element should be a random zero/one and not an "X" value. For instance, a state element A may have a first ODC-based clock enable, and the output of the state element A may also be used to generate a second ODC-based clock enable for another state element B. In certain circuit topologies, it is possible for an "X" value injected at the output of the state element A (when A's ODC-based clock enable goes to zero) to propagate to an observable point (i.e., an internal comparison point or a primary output). In one embodiment, the clock-gated state elements whose outputs are used to generated ODC-based clock enables for other clock-gated state elements are "tagged" in a preprocessing step during the test bench creation process. Random zero/one values, rather than "X" values, are then injected for these state elements as part of the simulation-based verification.

Figure 9:
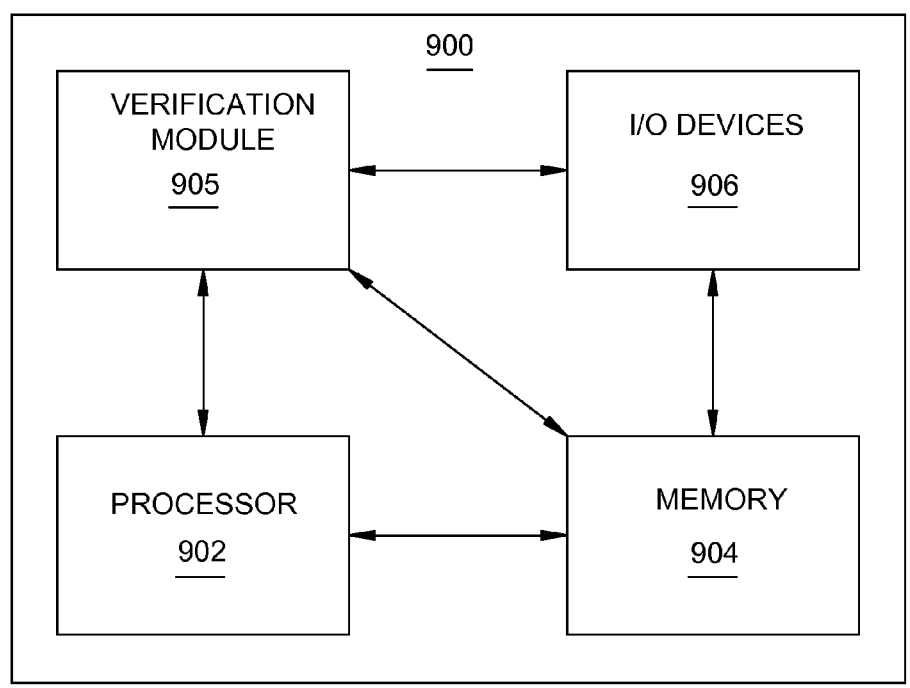
FIG. 9 is a high level block diagram of a general purpose computer or a computing device suitable for use in performing some or all of the functions described herein.

FIG. 9 is a high level block diagram of a general purpose computer or a computing device suitable for use in performing some or all of the functions described herein. The general purpose computer may incorporate, for example, a logic simulator and/or tools for generating test benches for verification purposes. As depicted in FIG. 9, the general purpose computer 900 comprises a processor element or processing elements 902 (e.g., a central processing unit (CPU)), a memory 904 (e.g., a random access memory (RAM) and/or a read only memory (ROM)), a verification module 905 for generating a test bench by which output-based clock gating of an integrated circuit design can be verified, and various input/output devices 906 (e.g., storage devices, including but not limited to, a memory device, a tape drive, a floppy drive, a hard disk drive a compact disk drive, or an optical drive, a receiver, a transmitter, a speaker, a display, a speech synthesizer, an output port, and a user input device (such as a keyboard, a keypad, a mouse, and the like)).

The described embodiments can be implemented in a combination of software and hardware (e.g., using application specific integrated circuits (ASIC), a general purpose computer, one or more portions of a programmable logic device (PLD), or any other hardware equivalents such as microprocessors). In one embodiment, one or more steps of the present module or process for generating a test bench by which output-based clock gating of an integrated circuit design can be verified may be loaded into memory 904 and executed by processor 902 to implement the functions as discussed above. As such, the present module or process 905 for generating a test bench of the described embodiments can be stored on a non-transitory computer readable storage medium or a storage device (e.g., RAM memory, magnetic or optical drive or diskette and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing describes exemplary embodiments in accordance with one or more aspects of the present disclosure, other and further embodiments in accordance with the one or more aspects of the present disclosure may be devised without departing from the scope thereof, which is determined by the claims that follow and equivalents thereof. Claims listing steps do not imply any order of the steps. Trademarks are the property of their respective owners.

What is claimed is:

1. A method for verifying a functional equivalency between a design of an integrated circuit and a corresponding clock-gated design utilizing output-based clock gating, where the design comprises a first plurality of internal state elements and the clock-gated design comprises a second plurality of internal state elements, the method comprising:

selecting a first one of the first plurality of internal state elements and a corresponding first one of the second plurality of internal state elements, wherein an input to the first one of the first plurality of internal state elements of the design of the integrated circuit serves as a first comparison point and an input to the corresponding first one of the second plurality of internal state elements of the corresponding clock-gated design serves as a second comparison point, and the design of the integrated circuit is to be compared against the clock-gated design at the first comparison point and the second comparison point for verifying the functional equivalency between the design of the integrated circuit and the corresponding clock-gated design; and generating, using a processor, a test bench that identifies the input to the first one of the first plurality of internal state elements and the input to the corresponding first one of the second plurality of internal state elements as a set of comparison points.

2. The method of claim 1, wherein a value at the first comparison point in the design will match a value at the second comparison point in the clock-gated design, when the clock-gated design is functionally equivalent to the design.

3. The method of claim 1, wherein the selecting comprises:

tracking at least one observability don't care (ODC)-based clock gating condition that propagates upstream in the clock-gated design until an internal state element is reached at which an input is not affected by the at least one ODC-based clock gating condition, the internal state element being the first one of the first plurality of internal state elements.

4. The method of claim 1, wherein the first one of the first plurality of internal state elements and the corresponding first one of the second plurality of internal state elements has an existing clock gating condition in the design.

5. The method of claim 4, wherein the corresponding first one of the second plurality of internal state elements has an observability don't care (ODC)-based clock gating condition in the clock-gated design in addition to the existing clock gating condition.

6. The method of claim 5, wherein the observability don't care (ODC)-based clock gating condition is not propagated upstream.

7. The method of claim 6, wherein the first comparison point mimics a value of an input to the first one of the first plurality of internal state elements in accordance with a value of a clock enable defined by the existing clock gating condition.

8. The method of claim 1, wherein the first one of the first plurality of internal state elements and the corresponding first one of the second plurality of internal state elements are flip flops.

9. The method of claim 1, wherein the first one of the first plurality of internal state elements and the corresponding first one of the second plurality of internal state elements are flip flop macro structures.

10. The method of claim 1, wherein the first one of the first plurality of internal state elements and the corresponding first one of the second plurality of internal state elements are memory structures.

11. The method of claim 10, wherein the first comparison point and the second comparison point each comprises an address value and a write data-in value to the memory structures during a clock cycle in which a write enable signal is active to the memory structures.

12. The method of claim 1, further comprising:

identifying a second one of the first plurality of internal state elements and a corresponding second one of the second plurality of internal state elements that have an observability don't care (ODC)-based clock enable; and incorporating into the test bench a condition that causes a faulty value to be injected at an output of the second one of the first plurality of internal state elements and at an output of the corresponding second one of the second plurality of internal state elements at a clock cycle during which the ODC-based clock enable is zero.

13. The method of claim 12, further comprising:

performing, subsequent to an injection of the faulty value, a logic comparison at an observable point in the design and a corresponding observable point in the clock-gated design, wherein the logic comparison verifies that the clock-gated design is functionally equivalent to the design when the faulty value does not propagate to the observable point in the design and the corresponding observable point in the clock-gated design and when logic values compared at the observable point in the design and at the corresponding observable point in the clock-gated design are identical.

14. The method of claim 12, wherein the corresponding second one of the second plurality of internal state elements is an internal state element in the clock-gated design whose ODC-based clock enable is zero at a cycle in the clock gated design.

15. The method of claim 12, wherein the second one of the first plurality of internal state elements is an internal state element in the design that corresponds to the corresponding second one of the second plurality of internal state elements in the clock-gated design whose ODC-based clock enable is zero at a cycle in the clock gated design.

16. The method of claim 12, wherein the second one of the corresponding second plurality of internal state elements corresponds to a first internal state element in the clock-gated design whose ODC-based clock enable is zero at a cycle in the clock gated design and the second one of the first plurality of internal state elements in the design corresponds to the first internal state element in the clock-gated design.

17. The method of claim 1, wherein the test bench is geared for use in a simulation verification environment.

18. The method of claim 1, wherein the first one of the second plurality of internal state elements has an observability don't care (ODC)-based clock gating condition in the clock-gated design.

19. A non-transitory computer-readable storage medium having stored thereon a plurality of instructions, the plurality of instructions including instructions which, when executed by a processor, cause the processor to perform a method for verifying a functional equivalency between a design of an integrated circuit and a corresponding clock-gated design utilizing output-based clock gating, where the design comprises a first plurality of internal state elements and the clock-gated design comprises a second plurality of internal state elements, comprising:
   selecting a first one of the first plurality of internal state elements of the design of the integrated circuit and a corresponding first one of the second plurality of state elements of the corresponding clock-gated design for verifying the functional equivalency between the design of the integrated circuit and the corresponding clock-gated design, wherein an input to the first one of the first plurality of internal state elements serves as a first comparison point and an input to the corresponding first one of the second plurality of state elements serves as a second comparison point, and the design is to be compared against the clock-gated design at the first comparison point and the second comparison point; and
   generating a test bench that identifies the input to the first one of the first plurality of state elements and the input to the corresponding first one of the second plurality of state elements as a set of comparison points.

20. A method for verifying a functional equivalency between a design of an integrated circuit and a corresponding clock-gated design utilizing output-based clock gating, where the design comprises a first plurality of internal state elements and the clock-gated design comprises a second plurality of internal state elements, the method comprising:
   selecting a first one of the first plurality of internal state elements of the design of the integrated circuit and a corresponding first one of the second plurality of internal state elements of the corresponding clock-gated design for verifying the functional equivalency the functional equivalency between the design of the integrated circuit and the corresponding clock-gated design, wherein the first one of the plurality of internal state elements and the corresponding first one of the second plurality of internal state elements have an observability don't care (ODC)-based clock enable; and
   generating, using a processor, a test bench that causes a faulty value to be injected at an output of the first one of the plurality of internal state elements and at an output of the corresponding one of the second plurality of internal state elements at a clock cycle during which the ODC-based clock enable is zero.

* * * * *